(No Model.) 3 Sheets—Sheet 1.

F. H. RICHARDS.
MECHANICAL MOVEMENT.

No. 340,156. Patented Apr. 20, 1886.

Witnesses:
Frank H. Pierpont
John Johnston

Inventor:
Francis H. Richards (No Model.) 3 Sheets—Sheet 2.

F. H. RICHARDS.
MECHANICAL MOVEMENT.

No. 340,156. Patented Apr. 20, 1886.

Witnesses:
Frank H. Pierpont
John Johnston

Inventor:
Francis H. Richards.

(No Model.)  3 Sheets—Sheet 3.
F. H. RICHARDS.
MECHANICAL MOVEMENT.
No. 340,156.  Patented Apr. 20, 1886.
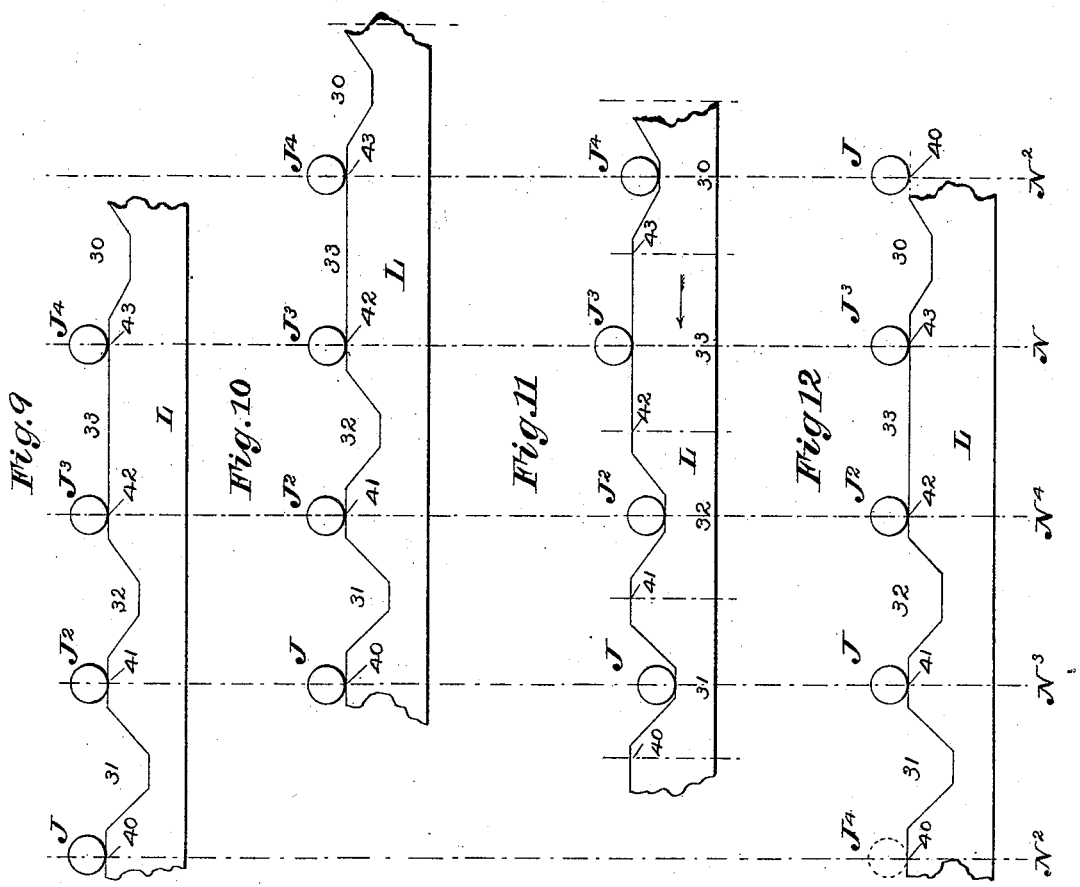
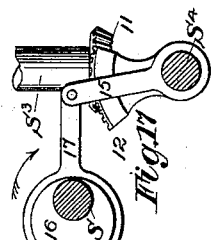
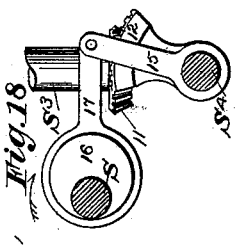
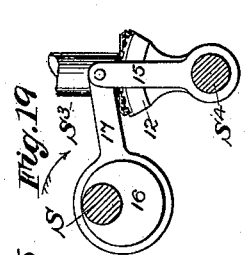
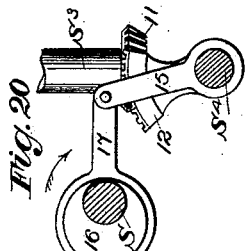
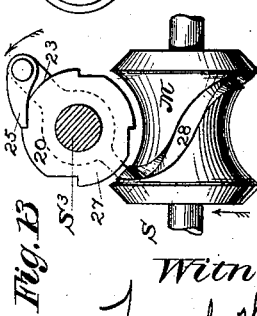
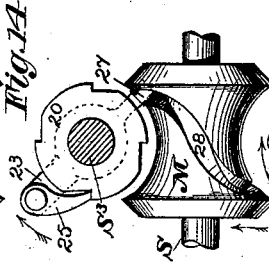
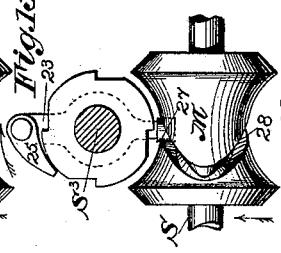
Witnesses:
Frank N. Pierpont
John Johnston
Inventor:
Francis H. Richards
N. PETERS. Photo-Lithographer, Washington, D. C.

UNITED STATES PATENT OFFICE.

FRANCIS H. RICHARDS, OF SPRINGFIELD, MASS., ASSIGNOR OF ONE-HALF TO THE PRATT & WHITNEY COMPANY, OF HARTFORD, CONN.

MECHANICAL MOVEMENT.

SPECIFICATION forming part of Letters Patent No. 340,156, dated April 20, 1886.

Application filed September 16, 1885. Renewed March 27, 1886. Serial No. 196,858. (No model.)

*To all whom it may concern:*

Be it known that I, FRANCIS H. RICHARDS, a citizen of the United States, residing at Springfield, in the county of Hampden, State of Massachusetts, have invented certain new and useful Improvements in Mechanical Movements, of which the following is a specification.

This invention relates to mechanical movements for actuating slides, the object being to provide such an apparatus adapted to carry one or more slides successively to each of a series of stations, and there impart to said slides a reciprocating motion.

To this end the invention consists in the combinations hereinafter set forth.

Figure 1:
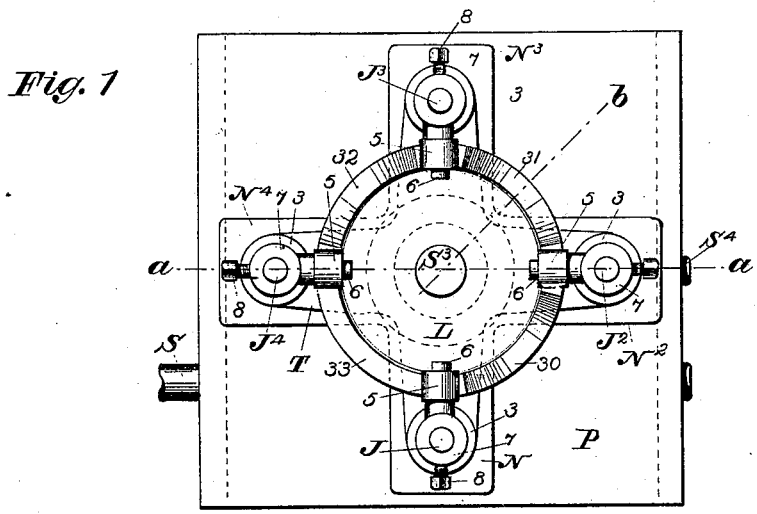
Figure 4:
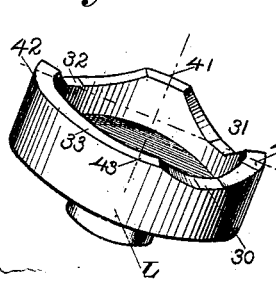
Figure 2:
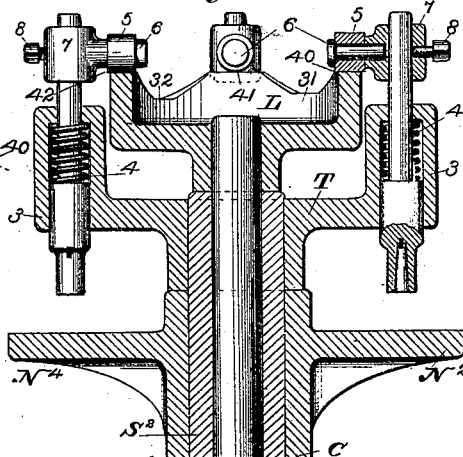
Figure 3:
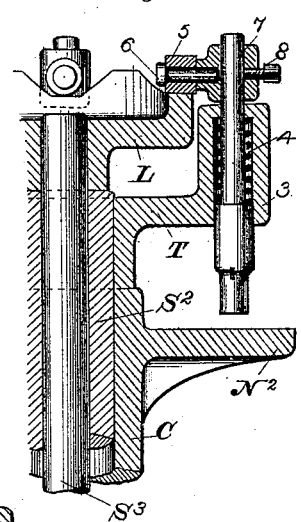
Figure 5:
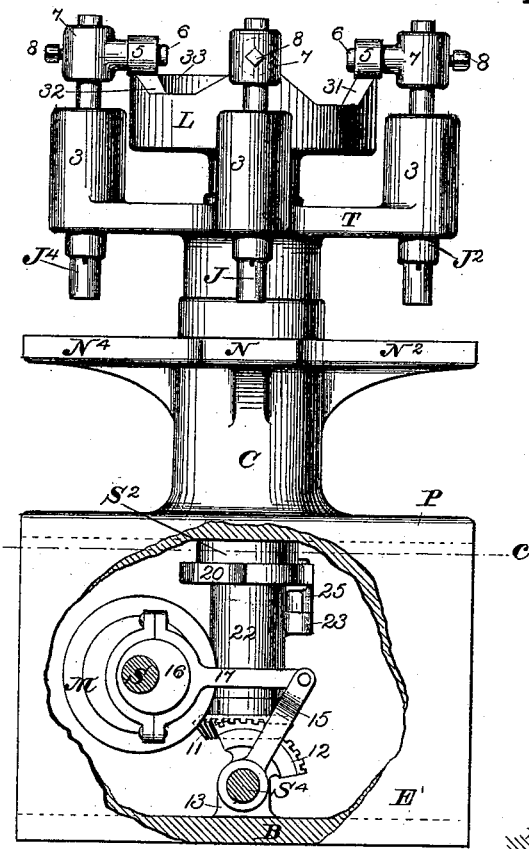
Figure 7:
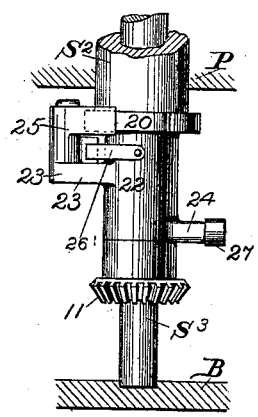
Figure 6:
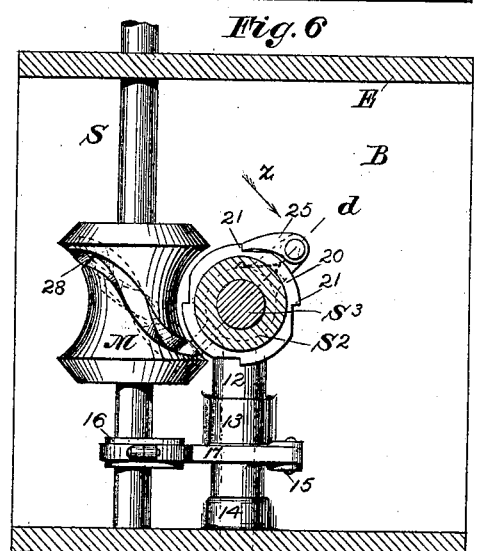
Figure 8:
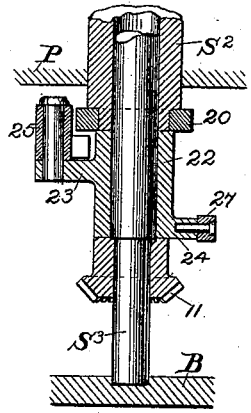

In the drawings accompanying and forming a part of this specification, Figure 1 is a top view of a mechanical movement embodying my invention. Fig. 2 is a vertical section in line $a\ a$, as seen from the front. Fig. 3 is a repetition of the upper right-hand portion of Fig. 2, showing certain parts in a different position. Fig. 4 is a perspective view of the lifting-cam. Fig. 5 is an elevation of the end at the right hand in Figs. 1 and 2, a part of the frame being broken away to disclose the operative mechanism. Fig. 6 is a horizontal section in line $c\ c$, Fig. 5, showing what is below said line. Fig. 7 is an elevation of the ratchet mechanism, as seen in the direction of arrow Z, Fig. 6. Fig. 8 is a vertical section of the same in line $d$, Fig. 6. Figs. 9, 10, 11, and 12 are diagrams which illustrate, respectively, the position of the slides at the first, second, third, and fourth quarters or stages of their movement. Figs. 13, 14, 15, and 16 show, respectively, the four corresponding positions of the rotating mechanism. Figs. 17, 18, 19, and 20 show, similarly, the four corresponding positions of the oscillating mechanism operating the lifting-cam.

Similar characters designate like parts in all the figures.

The several operative parts of my newly-invented mechanical movement are supported by a frame-work, which, as herein shown, is constructed as follows: B is a base-plate, having ends E E', for supporting the top plate, P. Rising from said plate P there is a hollow column, C, which serves as a bearing for a tubular shaft, $S^2$, and which may have, also, projecting shelves or stations N, $N^2$, $N^3$, and $N^4$, (designated singly without choice or collectively as station or stations N,) whereon to place whatever things are to be acted on by means of the corresponding slides described below. A turret, T, is rigidly fixed to or formed on the upper end of shaft $S^2$, and has a series of bearings, 3, carrying the slides individually designated as J, $J^2$, $J^3$, and $J^4$, and singly without choice or collectively as slide or slides J. These slides, which usually do not turn in their bearings, are pushed down by springs 4, and are lifted up by a lifting-cam, L, fixed on the upper end of shaft $S^3$, which cam acts on rolls 5, affixed to the slides by any convenient means—as, for instance, pin 6, hub 7, and set-screw 8. By making this cam to have an upper part or guard above the rolls, as at 10, Fig. 3, it will operate the slides in both directions, thereby dispensing with springs 4.

The shaft $S^3$ and cam L, carried thereon, have a rotary reciprocating movement imparted to them by means of some suitable mechanism, which I designate as the "reciprocating mechanism," and which, as I prefer to construct it, consists of the following: Near its lower end said shaft is provided with a gear, 11, meshing with a corresponding segment, 12, on shaft $S^4$. This shaft is supported in bearings 13 14, and has an arm, 15, which is operated from eccentric 16 by means of the ordinary eccentric-rod, 17. It is obvious these devices will impart to cam L the movement above specified, and also that a cam-actuated mechanism could be substituted for this eccentric-actuated one.

Shaft $S^2$ and turret T, carried thereon, have an intermittent rotary movement imparted to them by means of some suitable mechanism, which I designate as the "rotating mechanism," and which, as I now prefer to construct it, consists of the following: At its lower end said shaft has affixed thereto a ratchet-wheel, 20, having a series of notches, 21, Fig. 6, equal in number to spindles J. Below this wheel, and above gear 11, a sleeve, 22, is fitted to turn freely on shaft $S^3$. Said sleeve has two arms, 23 and 24, the first of which carries a pawl, 25, for operating said wheel, (being kept against the wheel by spring 26,) while arm 24 carries a roll or pin, 27, which works in groove 28 of the cam M. The nature of this groove will be readily understood by comparing the several figures of drawings in which the cam is shown, it being proportioned so as to oscillate arm 24 through an arc of a little more than ninety degrees. The two sides of said cam being symmetrical, the pawl 25, and by it the ratchet-wheel, shaft, and turret, are moved forward in one half-revolution of shaft S, and the pawl is returned during the next half-revolution.

As an equivalent for the above-described rotating mechanism, I may use the "mechanism for converting motion" described and claimed in United States Patent No. 297,165, granted to me April 22, 1884, the application of which to my present purposes will be obvious.

I have herein shown and described the turret and lifting-cam as placed above their operating mechanisms. This arrangement is not essential to my invention, for, by a suitable modification of the frame work, said mechanisms may obviously be placed uppermost.

In Figs. 9 to 12, I have shown the rim of cam L as if broken in two and straightened out, and have supposed the slides J to be situated in a straight line alongside thereof, and as said slides have the same movements as their rollers 5, I have, for the sake of simplicity, omitted in these figures the drawing of said slides, and have shown the rollers designated by the characters belonging to said slides, thus making the roller a symbol of itself and the slide together.

The operation of my improved mechanical movement is as follows: On rotating shaft S the rotating mechanism operates, as above described, to impart an intermittent forward movement to the turret, carrying each slide J successively to each station N. At the same time the reciprocating mechanism operates to impart a forward movement to cam L during the same movement of the turret and slides, and a corresponding backward movement to said cam while the turret is at rest. The forward movement of the slides and of cam L are substantially identical, so that, while moving forward, rolls 5 stand at about the same points, as 40, 41, 42, and 43, Fig. 4, on said cam, and thus practically impart no vertical movement to said slides; but on the return movement of cam L, which turns back about ninety degrees, (in practice usually from seventy to one hundred degrees,) each slide is operated according to the conformation of that section of the cam passing under its roller. In Fig. 9 is shown the positions of slides J and the several parts of cam L relative to each other and to the stations indicated by dotted lines, at the beginning of a forward movement, this being toward the right hand. In Fig. 10 said movement has been completed, the same relations of slides and cam being maintained, but all advanced one station. In Fig. 11 the slides remain at the same stations as in Fig. 10; but the cam is represented as in the middle of its return movement, the several slides standing at different elevations corresponding to the various shapes of the respective sections 30, 31, 32, and 33 of said cam. In Fig. 12 the cam has completed its return movement, and stands in the same relation to the stations as in Fig. 9, while the slides, having been lifted the same as in said figure, remain at the stations to which they have thus been advanced. The several operations continuing as described, each slide is brought successively to every station and every slide successively to each station; but whichever slide may, during one complete movement, be at a given station, its operation while there is always the same, and at each different station the slides may have a different vertical movement, or at some station or stations may have none at all—as, for instance, at station N—the corresponding section, 33, of the cam being formed plain, as shown.

Having thus described my invention, I claim—

1. The combination, in a mechanical movement having stations arranged in a circuit, of one or more slides, mechanism, substantially as described, carrying said slide or slides to each of said stations successively, and mechanism, substantially as described, imparting a reciprocating movement to the slide or slides at one or more of said stations, substantially as set forth.

2. The combination, in a mechanical movement having stations arranged in a circuit, of an intermittently-rotating turret having bearings corresponding to said stations, slides in said bearings, a cam operating said slides at said stations, and means, substantially as described, operating said turret and cam, substantially as set forth.

3. The combination, in a mechanical movement, of turret T, having bearings for slides, slides J, carried in said bearings and having rolls or pins 5, cam L, having sections formed to impart a reciprocating movement to said slides, and means, substantially as described, imparting an intermittent rotary movement to said turret, and a rotary reciprocating movement to said cam, substantially as set forth.

FRANCIS H. RICHARDS.

Witnesses:
FRANK H. PIERPONT,
WILBUR M. STONE.